United States Patent Office 3,239,340
Patented Mar. 8, 1966

3,239,340
METHOD FOR STABILIZING DEVELOPED PHOTOSENSITIVE MATERIALS
Kintaro Nasu and Katsumi Hayashi, Ashigarakami-gun, Kanagawa-ken, Japan, assignors to Fuji Shashin Film Kabushiki Kaishi, Kanagawa-ken, Japan, a corporation of Japan
No Drawing. Filed Feb. 7, 1964, Ser. No. 343,215
Claims priority, application Japan, Feb. 18, 1963, 38/7,199
9 Claims. (Cl. 96—61)

This invention relates to a method for stabilizing developed photosensitive materials and more particularly to a method for stabilizing the developed image without the two steps of fixing with sodium thiosulfate and washing with water.

The invention further relates to an improved composition for stabilizing developed photosensitive materials.

Fixing is carried out in order to remove silver halide in the non-exposed parts after development. However, because silver-thiosulfate complex formed during fixing is unstable to light, it is removed by washing with water.

Many complex-forming agents which are effective as stabilizers have been reported in technical literature. H. D. Russell, B. C. Yackel, G. B. Bruce, P.S.A. Journal, section B, August 1950, p. 59–62, disclose the use of alkali thiosulfates, alkali thiocyanates, ammonium thiosulfate and ammonium thiocyanate. Usually ammonium thiocyanate is used. In this case a silver complex represented by the general formula $(NH_4)_xAg(CNS)_y$ is formed.

This salt is a transparent crystal and locates at white or transparent parts. Since this salt is stable to light it is unnecessary to remove it by washing with water (ref. B.P. No. 867,242, F.P. No. 1,206,359, No. 1,239,429 or No. 1,258,356). Such treatment for stabilization enables rapid development but it is attended by many disadvantages in the quality of image. In order to ensure stability to light, the silver complex-forming agent is used in excess amount than the theoretical one. Because of the hygroscopic property of the agent, the surface of processed emulsion layer tends to become sticky. The silver complex-forming agent gradually oxidizes metallic silver constituting the image, converting it into silver complex and decreasing the density of the image or vanishing the image. In other words, if photosensitive materials subjected to the stabilizing treatment are placed in air, the decrease in density, and the change in color from black to brown or yellow becomes remarkable with the lapse of time, and in an extreme case the image disappears. Such fading phenomenon is often observed when the material is maintained under high humidities.

The inventors have found that the hygroscopic nature of the stabilized image can be significantly reduced and moreover the oxidation of alkali metal- or ammonium-sulfites, bisulfites, and pyrosulfites to be added in order to prevent fading can be prevented by the addition of a suitable amount of boric acid and a water-soluble borate to the stabilizing solution.

As examples of the water-soluble borate used in the invention, there are borax, sodium metaborate and the like.

Boric acid and the borate may be added into the stabilizing solution in any desired amounts from 0.01 mol of boric acid and 0.005 mol of the borate based on 1 liter of the stabilizing solution up to the solubility limits, but preferably in the amounts of 0.15–0.25 mol of boric acid and 0.02–0.05 mol of the borate at which the stabilizing solution shows a suitable acidity (pH 4.0–6.0) or has a suitable buffer action. Due to the buffer action, the lowering of the stabilizing activity caused by admixture of the developing solution, namely by rapid increase of the pH, can be prevented.

The above-mentioned compounds may be used together with a heavy metal salt having activity in stabilizing the image by forming a soluble or an insoluble complex salt with the silver complex salt-forming agent, such as Ni, Co, Cd, Zn, Au and the like. Additionally or alternatively to the heavy metal salt, there may be used a compound having an effect of preventing fading of the image silver represented by one of the following general formulas.

(1)
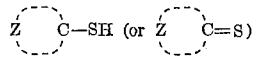

wherein

indicates an unsubstituted or substituted heterocyclic residue, such as, an imidazolyl group, a benzimidazolyl group, a thiazolyl group, a benzothiazolyl group, an oxazolyl group, a benzoxazolyl group, a triazolyl group, a thiadiazolyl group, an oxadiazolyl group, a 5-tetrazolyl group, a pyridyl group, a pyrimidinyl group, a pyrazinyl group, a pyridazinyl group, a triazinyl group, a thiodiazinyl group, or a condensation ring of them.

Typical examples of the above compounds are 2-mercapto imidazole, 2-mercapto benzimidazole, 5-carboethoxy-2-mercapto-4-methylthiazole, 2-mercaptobenzo thiazole, 2-mercapto 2-mercapto benzoxazole, and 2-mercapto-5-methyl oxadiazole.

The formula shown above in parenthesis means that the compound having formula

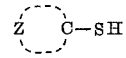

may take the formula in parentheses as a result of tautomerism.

(2)
$$X(CH_2)_l(CH)_m(CH_2)_nSH$$
$$\quad\quad\quad\quad |$$
$$\quad\quad\quad\quad Y$$

wherein X and Y each represents a member selected from the group consisting of H, a hydroxyl group, an alkoxy group, an amino group, an alkylamino group, a carboxyl group, a carboalkoxy group, a thiol group, a sulfo group, a halogen, an alkyl group, an aryl group, and a heterocyclic residue, and $l$, $m$, and $n$ each represents 0, 1 or 2.

Preferred examples of the compounds are 2-mercaptoethanol, 1-thioglycerol, 2-mercaptoethyl chloride, 2-diethyl aminoethane thiol chloride, thio glycolic acid and 2-mercaptopropionic acid.

(3)
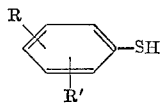

wherein R and R' each represents a member selected from the group consisting of H, an alkyl group, a hydroxyl group, an alkoxy group, a thiol group, an amino group, an alkylamino group, a carboxyl group, a carboalkoxy group, a sulfo group, and a halogen; R and R' may be combined with each other and a hetero atom may be present in the combined chain.

Typical examples of the compounds are thiophenol, 4-thiocresol, thiosalicylic acid, 1,3-dimercaptobenzene, 8-mercaptoquinoline, O-aminobenzenethiol chloride, and o-chlorothio phenol.

(4) 

wherein R is a member selected from the group consisting of an alkyl group, an aryl group, an aralkyl group, and a heterocyclic residue, and M is a member selected from the group consisting of H, Na, K, and $NH_4$.

Suitable examples of the compounds are sodium ethyl thiosulfonate, aminoethanethiosulfonate, sodium phenylthiosulfonate, and sodium paratoluene thiosulfonate.

(5) 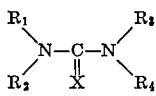

wherein $R_1$, $R_2$, $R_3$ and $R_4$ each represents a member selected from the group consisting of H, an alkyl group, an aryl group, an aralkyl group, an acyl group and a heterocyclic residue; $R_1$ and $R_3$ may be combined with each other; and X represents S or Se.

Typical examples of such compounds are N-methyl-thiourea, N,N'-dimethylthiourea, ethylenethiourea, acetylthiourea, N-ethyl-N'-diethylthiourea, N-(2-thiozolyl)-N'-arylthiourea, N-(2-pyridyl)-N'-phenylthiourea and N,N'-dicyclohexylselenourea.

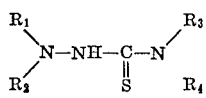

wherein $R_1$, $R_2$, $R_3$ and $R_4$ each represents a member selected from the group consisting of H, an alkyl group, an aryl group, an aralkyl group, an acyl group, a heterocyclic residue, an alkylidene, and arylidene; and $R_1$ and $R_3$ may be combined with $R_2$ and $R_4$ respectively.

Typical examples of the compounds are thiosemicarbazide, 1-phenylthiosemicarbazide, 4-ethylthiosemicarbazide, acetonethiosemicarbazone, and benzaldehydethiosemicarbazone.

*Example*

A photosensitive paper coated with a gelatinous silver chloride emulsion containing hydroquinone was exposed, developed and then treated with a stabilizing solution having the following composition.

| | | |
|---|---|---|
| Water | ml | 500 |
| Ammonium thiocyanate | g | 250 |
| Potassium pyrosulfite | g | 120 |
| Boric acid | g | 15 |
| Borax | g | 19 |
| Cobalt sulfate | g | 0.3 |
| 2-mercaptopropionic acid (1% alcoholic solution) | ml | 60 |

Water to make 1000 ml.

The image stabilized with this solution shows sufficient stability after drying and was less sticky at its surface because of reduction of hygroscopic property. Trouble caused by the stickiness when the emulsion side was folded immediately after the treatment was remarkably reduced. When the photographic image was maintained as a difficult test under a high moisture condition of 100% R.H., the reduction of density of the image was less and the image treated by the invention was preserved for a longer period than the image stabilized with the similar stabilizing solution containing no boric acid and borate.

The result of the incubation test of the stabilized print at 100% R.H. at an appropriate temperature is shown in the following table.

| | Lowering of density after 4 hours | |
|---|---|---|
| | The first | The one hundredth |
| A stabilizing solution not containing boric acid and borate | 0.52 | 0.73 |
| A stabilizing solution containing boric acid and borate | 0.21 | 0.31 |

One liter of a stabilizing solution was placed in a tray 6½ by 8½ inches, and exposed in air for 5 days. The quantity of potassium pyrosulfite contained in the stabilizing solution is shown in the following table.

| | Quantity of potassium pyrosulfite |
|---|---|
| A stabilizing solution not containing boric acid and borate | 95 g./1 lit. |
| A stabilizing solution containing the above substances | 110 g./1 lit. |

What is claimed is:

1. A process for stabilizing a developed unfixed photosensitive material which comprises treating said developed unfixed photosensitive material with an aqueous solution containing (1) a silver complexing agent selected from the group consisting of alkali metal thiosulfates, ammonium thiosulfate, alkali metal thiocyanates, and ammonium thiocyanate; (2) a member seelcted from the group consisting of alkali metal sulfites, ammonium sulfite, alkali metal bisulfites, ammonium bisulfite, alkali metal pyrosulfites, and ammonium pyrosulfite; and (3) boric acid and a water-soluble borate.

2. The process as claimed in claim 1 wherein said water-soluble borate is borax.

3. The process as claimed in claim 1 wherein said water-soluble borate is sodium metaborate.

4. The process as claimed in claim 1 wherein said solution further contains a compound having the general tautomeric formulas

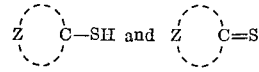

wherein

represents a member selected from the group consisting of an unsubstituted heterocyclic residue and a substituted heterocyclic residue.

5. The process as claimed in claim 1 wherein said solution further contains a compound having the general formula

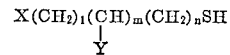

wherein X and Y each represents a member selected from the group consisting of hydrogen, an alkoxy group, an amino group, an alkylamino group, a carboxyl group, a carboalkoxy group, a thiol group, a sulfo group, a halogen, an alkyl group, an aryl group, and a heterocyclic residue; $l$, $m$ and $n$ each represents 0 or 1 or 2 but the sum of them is not 0.

6. The process as claimed in claim 1 wherein said solution further contains a compound having the general formula

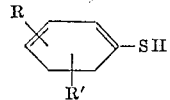

wherein R and R' each represents a member selected from the group consisting of hydrogen, an alkyl group, a hydroxyl group, an alkoxy group, a thiol group, an amino group, an alkylamino group, a carboxyl group, a carboalkoxy group, a sulfo group and a halogen.

7. The process as claimed in claim 1 wherein said solution further contains a compound having the general formula

wherein R represents a member selected from the group consisting of an alkyl group, an aryl group, an aralkyl group, and a heterocyclic residue and M represents a member selected from the group consisting of H, Na, K and $NH_4$.

8. The process as claimed in claim 1 wherein said solution further contains a compound having the general formula

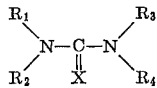

wherein $R_1$, $R_2$, $R_3$, and $R_4$ each represents a member selected from the group consisting of hydrogen, an alkyl group, an aryl group, an aralkyl group, an acyl group and a heterocyclic residue and X represents a member selected from the group consisting of S and Se.

9. The process as claimed in claim 1 wherein said solution further contains a compound having the general formula

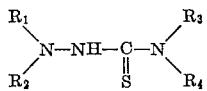

wherein $R_1$, $R_2$, $R_3$ and $R_4$ each represents a member selected from the group consisting of hydrogen, an alkyl group, an aryl group, an aralkyl group, an acyl group, a heterocyclic residue, an alkylidene and an arylidene.

References Cited by the Examiner
UNITED STATES PATENTS

| | | | |
|---|---|---|---|
| 2,706,687 | 4/1955 | Rees et al. | 96—61 X |
| 2,759,825 | 8/1956 | Land | 96—29 |

NORMAN G. TORCHIN, *Primary Examiner.*

C. E. DAVIS, *Assistant Examiner.*